Sept. 25, 1923. Re. 15,690

W. C. ANTHONY

ROCKER DUMPING BODY

Original Filed April 1, 1918 4 Sheets-Sheet 1

Inventor.
William C. Anthony
by Parker & Carter.
Attorneys.

Sept. 25, 1923. Re. 15,690

W. C. ANTHONY

ROCKER DUMPING BODY

Original Filed April 1, 1918 4 Sheets-Sheet 2

Inventor.
William C. Anthony.
by Parker & Carter.
Attorneys.

Sept. 25, 1923. Re. 15,690

W. C. ANTHONY

ROCKER DUMPING BODY

Original Filed April 1, 1918 4 Sheets-Sheet 3

Inventor.
William C. Anthony.
by Parker + Carter.
Attorneys.

Sept. 25, 1923. Re. 15,690

W. C. ANTHONY

ROCKER DUMPING BODY

Original Filed April 1, 1918 4 Sheets-Sheet 4

Inventor.
William C. Anthony
by Parker & Carter.
Attorneys.

Reissued Sept. 25, 1923.

Re. 15,690

UNITED STATES PATENT OFFICE.

WILLIAM C. ANTHONY, OF STREATOR, ILLINOIS, ASSIGNOR TO ANTHONY COMPANY, OF STREATOR, ILLINOIS, A CORPORATION OF ILLINOIS.

ROCKER DUMPING BODY.

Original No. 1,365,017, dated January 11, 1921, Serial No. 226,092, filed April 1, 1918. Application for reissue filed January 11, 1923. Serial No. 612,022.

*To all whom it may concern:*

Be it known that I, WILLIAM C. ANTHONY, a citizen of the United States, residing at Streator, in the county of La Salle and State of Illinois, have invented a certain new and useful Improvement in Rocker Dumping Bodies, of which the following is a specification.

My invention relates to improvements in dumping bodies for trucks and wagons and has among its objects to provide a dumping body which will automatically move to the dumping position when the lock which holds it in the carrying position is released and will then return to the loading position after the load has been discharged, though this arrangement may under certain circumstances be modified so that the return will not be complete but can be easily made by the hand of the operator with a minimum of effort, because under the same circumstances a complete return will be so sensitive that a slight inclination of the surface upon which the truck stands might cause unsatisfactory operation. Other objects are to provide an arrangement whereby the body is moved bodily to the rear as it rotates for dumping, thus making it possible to tip the bottom thereof more sharply and give it a sharper line of inclination thus insuring a more ready dumping of the contents. Other objects of my invention will appear from time to time in the specification.

My invention is illustrated more or less diagrammatically in the accompanying drawings, wherein—

Like parts are indicated by like characters in all the drawings.

A is a truck frame. It terminates immediately above the rear axle $A^1$. The axle, of course, is provided with the usual type of drive wheels $A^2$. I have broken away the forward end of the truck as it forms no part of my invention. $A^3$ is the drive shaft leading from the motor or the source of power at the forward end of the truck to the drive axle. $A^4$ is the operator's or driver's seat.

B B are tracks located one on either side of the main truck frame. These tracks are supported on brackets $B^1$ $B^1$ which extend outwardly from the frame so that the overall width between the tracks is greater than the width between the frame members. Each of these tracks is substantially Z-shaped and carries bolted thereon a rack $B^2$. The teeth of this rack do not extend up as far as the upper edge of the flange $B^3$ so that the rack is shrouded. $B^4$ $B^4$ are cam supports adapted to rest upon and roll along the track. They are geared as at $B^5$ and provided with flanges $B^6$ adapted to overlie the outer wall of the track. These flanges $B^6$ at their lower ends are enlarged as at $B^7$ and slotted at $B^8$. The slot $B^8$ is adapted to engage the head $B^9$ of the bolt $B^{10}$ in the track B. The arrangement of slot and head is such that as the cam support rotates along the track with the gear teeth thereon in mesh with the teeth in the rack, the bolt head is disengaged from the slot in the flange and there is no interference but when the support rotates back into the position shown in full lines the bolt, head and slot are in engagement and so the support is held against movement away from the track in a vertical direction.

Figure 2:
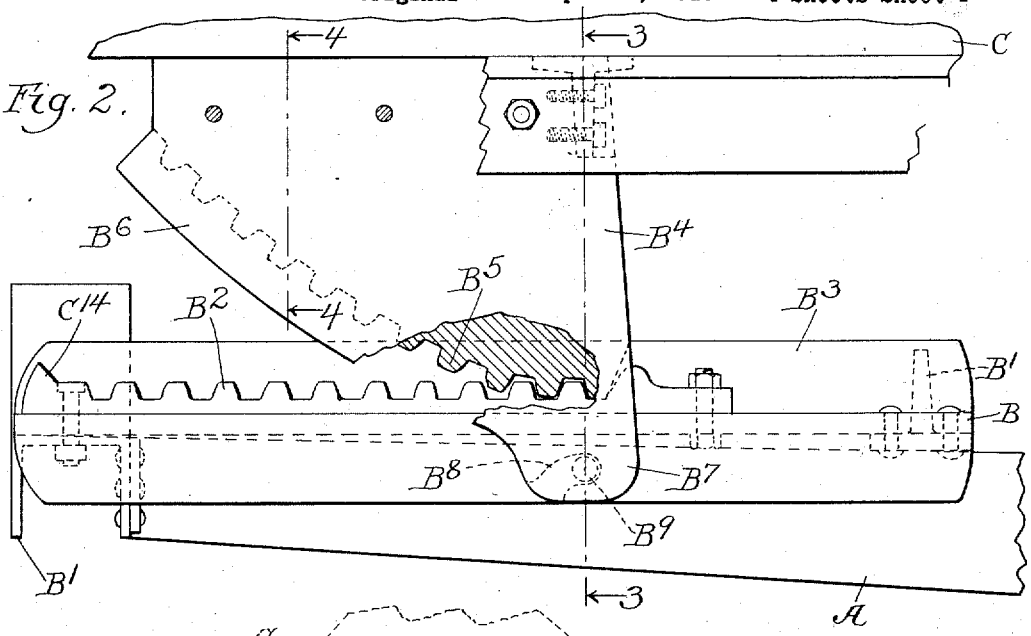
Fig. 2 is a detail of the rocker mechanism.
Figure 1:
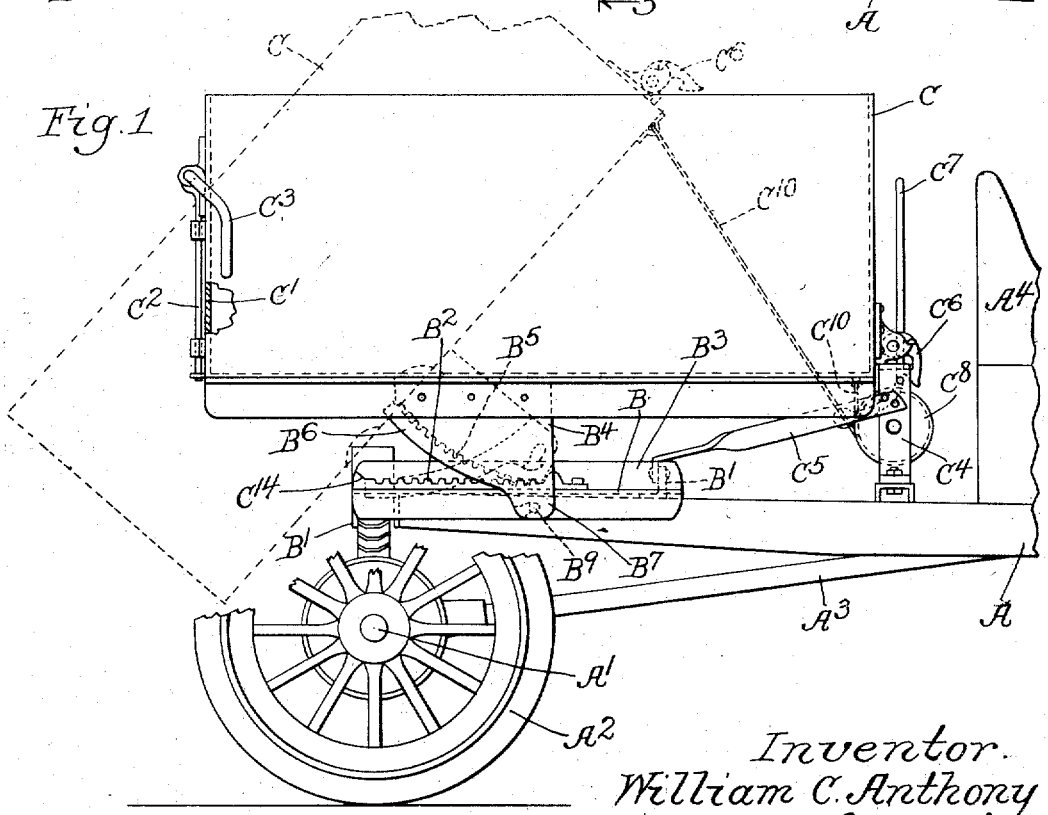
Figure 1 shows a side elevation.
Figure 7:
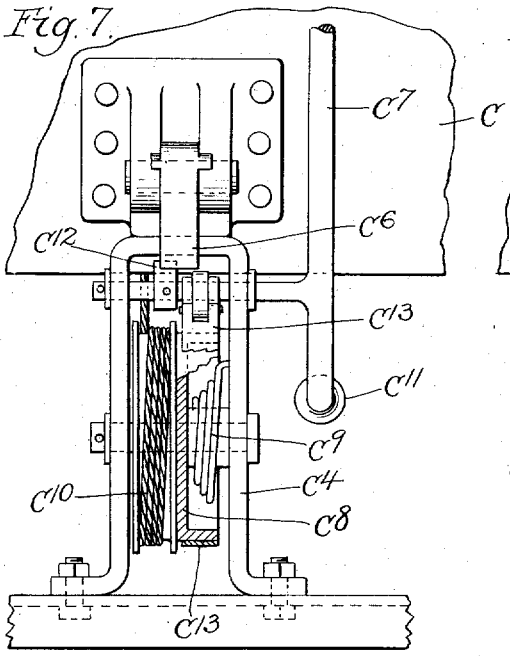
Fig. 7 is a detail front view in part section of the mechanism shown in Fig. 6.
Figure 6:
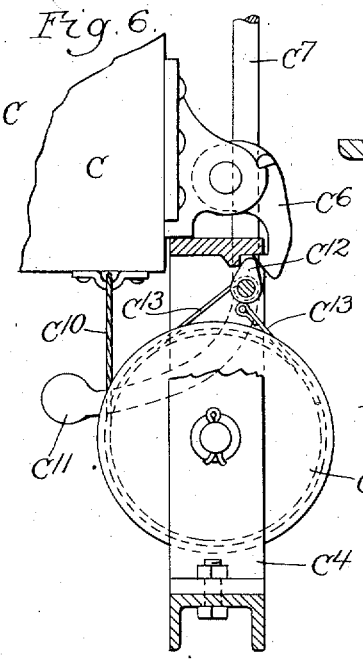
Fig. 6 is a detail in part section of the stop and return spring apparatus.
Figure 4:
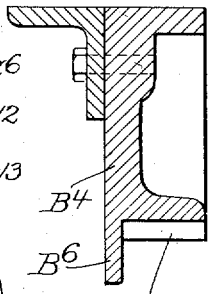
Fig. 4 is a section on line 4—4 of Fig. 2.
Figure 5:
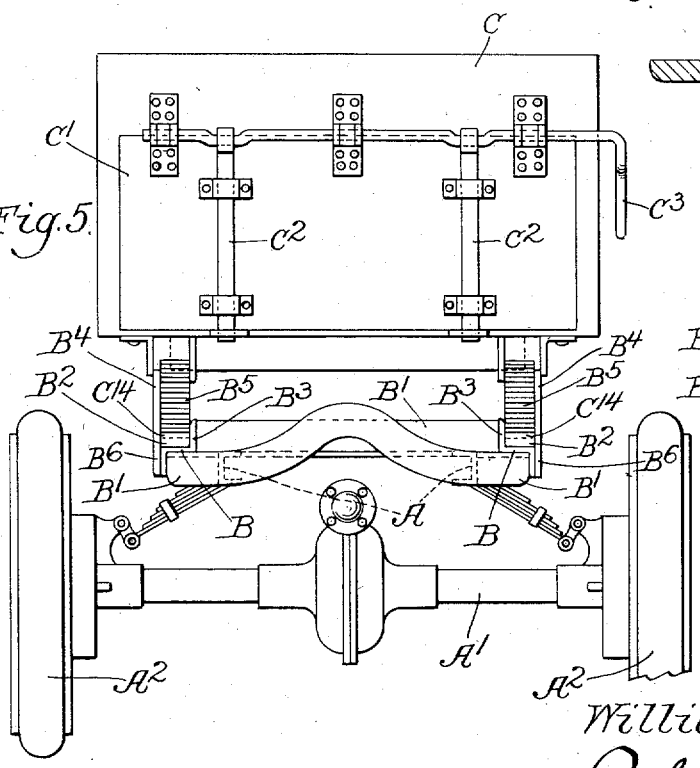
Fig. 5 is a rear view.
Figure 3:
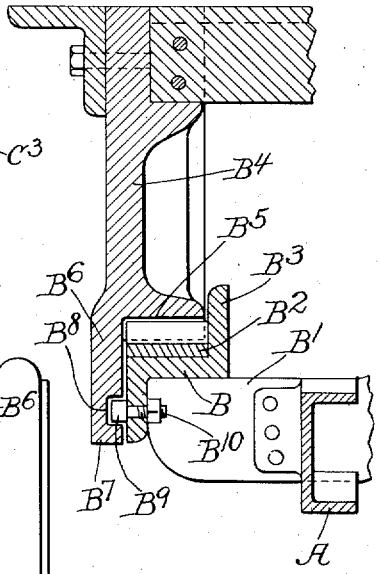
Fig. 3 is a section on line 3—3 of Fig. 2.

C is an open dump body mounted on the cam supports and thus supported by what I have called a rocker mechanism comprising the cam supports, track and associated parts. This body has a rear end dumping door $C^1$ adapted to be held closed by bolts $C^2$ which may be opened by the hand lever $C^3$ to permit dumping out of the contents when the body is in the inclined dumping position shown in dotted lines. $C^4$ is a stirrup mounted immediately behind the driver's seat adapted to support and limit the downward movement of the forward end of the truck body. This stirrup is braced as at $C^5$ and adapted to be engaged by latch $C^6$ pivoted on the front end of the body and manipulated by a hand lever $C^7$ which the operator may control. $C^8$ is a drum rotatably mounted upon the stirrup $C^4$. Wound about it is a cable $C^{10}$ which cable is anchored at one end on the drum, and at the other end to the dumping body. $C^9$ is a spring attached at one end to the drum, at the other end to the stirrup adapted to keep the cable always tight. $C^{11}$ is a counterweight which tends to hold the lever $C^7$ always in inoperative position as shown in Fig. 6. This lever $C^7$ has a lug $C^{12}$ adapted when the lever is rotated away from the dumping body to disengage the latch $C^6$ and permit the body itself to be released and fall by gravity. $C^{13}$ is a brake band surrounding a part of the drum $C^8$ controlled by the lever $C^7$ so that a further movement of the lever after the latch has been disengaged will tighten the brake band and enable the operator to control the speed with which the cable passes out, thus controlling the variations of the dumping movement. This spring is compressed and after the body is dumped assists in pulling in on the cable to make sure that it winds up on the drum so as to be ready to check the body on the next dumping movement. This makes it possible to completely stop the movement of the body at any time, as for instance, when it is desired to have the discharge comparatively gradual as in spreading gravel or crushed rock on a road and the like while the truck advances. The cable is of such length that it will be paid out when the body is in the final dumping position, and thus no other limiting action is needed. However, it will be observed that there is an abutment $C^{14}$ at the extreme end of the rack $B^2$ to keep the rocker from going too far.

Figure 8:
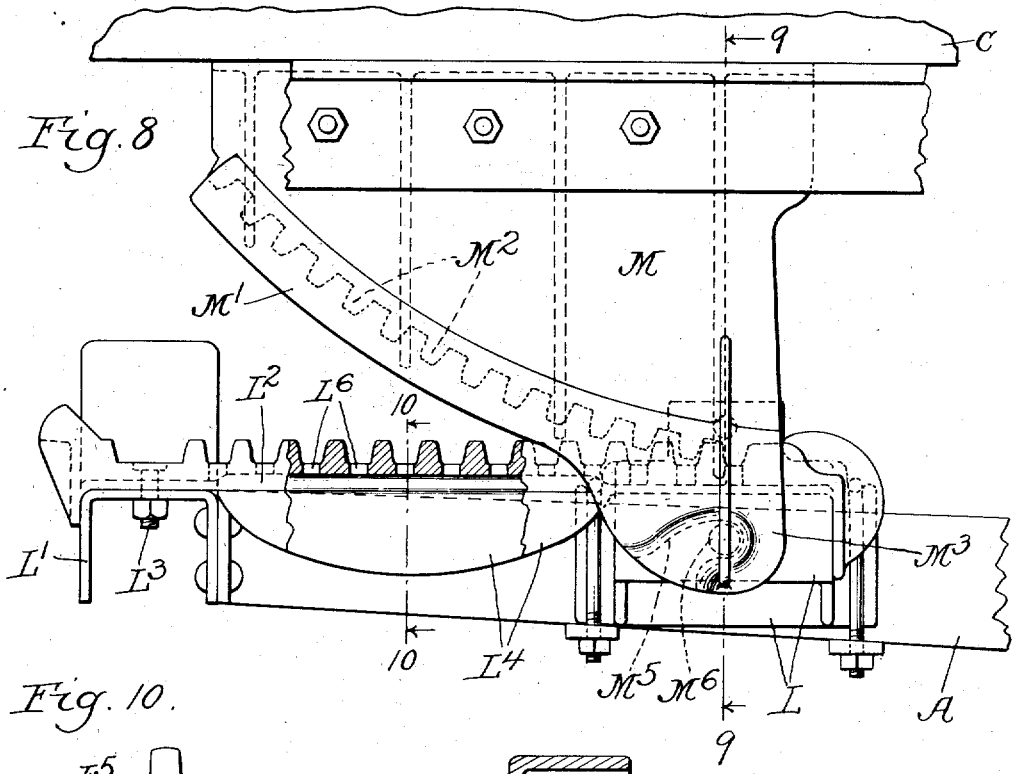
Fig. 8 is a detail side elevation of a modified form of rocker mechanism.
Figure 10:
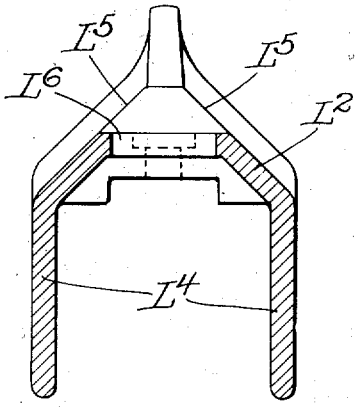
Fig. 10 is a section on the line 10—10 of Fig. 8.
Figure 9:
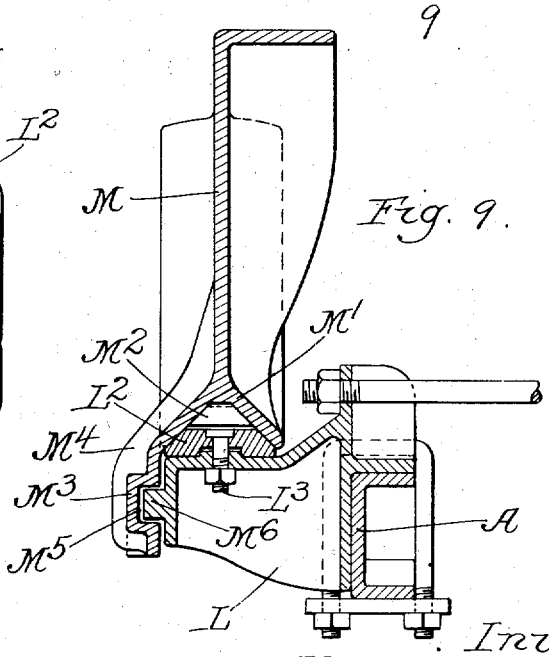
Fig. 9 is a section on the line 9—9 of Fig. 8.

In Figs. 8, 9 and 10 there is shown a slightly modified form.

L $L^1$ are brackets extending outwardly from the vehicle frame. Supported on these brackets is a toothed rack or track $L^2$ held in position upon the bracket by means of bolts $L^3$. These bolts it will be observed have heads located within counter-sunk holes in the track cut away so as not to interfere with the teeth. Between the brackets the track carries downwardly extending reinforcing channel members $L^4$, $L^4$, which give the track at the center a channel-shaped cross section. That part of the rack which carries the load is tapered or inclined into a V-shaped cross section as indicated in Figs. 9 and 10. Each tooth as at $L^5$ is sharply inclined and the space between the teeth is cut away as at $L^6$ so that there are no pockets on the rack where dirt or dust or mud can gather.

M is a rocker rigidly mounted on and depending downwardly below the vehicle body. It has a peripheral grooved flange $M^1$ adapted to rest upon the track and of substantially the same shape so that it fits the track. This rocker groove is toothed as at $M^2$ and these teeth mesh with the teeth on the rack so that the rocker fits on the rack and there is no danger of running off the track or slipping to one side or another. Downwardly depending from the outside of the rocker and flange $M^1$ is an extension plate $M^3$ reinforced by a rib as at $M^4$ and provided with a cam slot $M^5$ adapted to engage a lug $M^6$ on the bracket L. This cam slot is so shaped that if the rocker starts to roll from its position shown in Fig. 8, the slot will be moved away from the lug without interference, but if an effort is made to raise the body of the vehicle up or down without rolling it—an effort which might result from going over a bump—this cam slot will engage the lug and hold the body rigidly in position.

It will be noted that the surfaces on the track or rack which would otherwise tend to catch or hold dirt, mud and the like, are downwardly inclined and largely apertured. The inclined surface of the inner side of the flange on the rocker engaging this rack surface will, if it is covered with mud as it might be under certain circumstances, squeeze a large part of the mud out through the holes in the rack, and the remainder will be gradually worked down along the inclined surfaces and drop off or be forced off so that the rack and rocker act as the cleaner. There is no danger of dirt and mud being picked up into the space between the teeth, making the device inoperative.

It will be noted that as the body rotates in view of the fact that the center of gravity is way above the center of support or the line of support and in view of the fact that the supporting cam is way below the body, the whole body moves backward an appreciable distance. The result of this is that when the body is being dumped it is inclined gradually and at the same time moved bodily backward so that the body may normally be much further forward on the truck frame and still be rotated far enough to give the desired inclination without bodily raising the body. It will be understood that if the body is to be dumped without the use of some power means it must be merely rolled and cannot be raised or lifted but ordinarily when this is done the body can only rotate a short distance because it comes in contact with the frame and so the material does not flow freely out.

In my arrangement the body is displaced by a rolling action and also tilted so that the body is moved far enough back to make it possible for it to clear the rear end of the frame and thus be sufficiently sharply inclined to effect the dumping movement.

Figure 11:
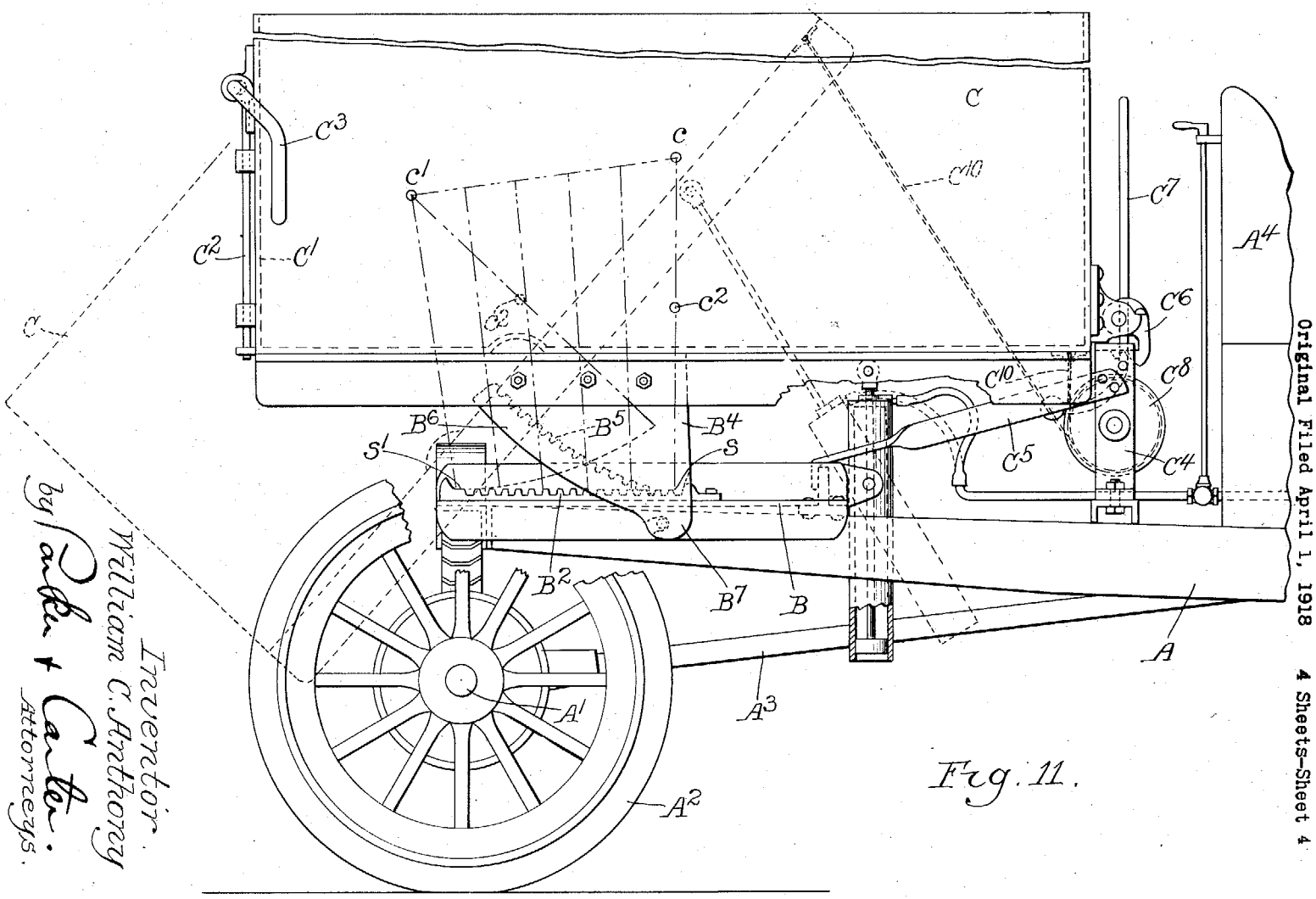
Fig. 11 is a side elevation of the rear portion of a dumping wagon equipped with a power means of restoring the body after dumping.

In Fig. 11 I have shown a plunger reciprocating in a hydraulic chamber and a piston whereby the operator may control hydraulic power from the engine or other suitable source to manipulate the body. This forms no part of my invention but merely indicates that under certain circumstances it might be desirable to have such power means to return the body to the normal position in the event that it proved impossible under certain circumstances, to have a fully automatic return.

It will be evident that while I have shown in my drawings an operative device, still many changes might be made both in size, shape and arrangement of parts without departing materially from the spirit of my invention and I wish, therefore, that my invention be regarded as in a sense diagrammatic.

The use and operation of my invention are as follows:—

The body is supported by the curved rocker on the rack. The teeth are provided to make the operation more accurate. Obviously they might be dispensed with as the teeth only prevent slipping. The arrangement is such that the center of gravity of the body when it is loaded is behind the center of support at the lower end of the rocker. When the latch is released the weight of the body causes the body to rotate, and since the rocker is inclined to the rear the body also moves toward the rear and comes to rest at its raised position at a steep angle of rest so that material can easily be discharged by gravity. When the load is discharged from the body the center of gravity is nearer the bottom of the body, and in my preferred form of design, drops down so low that it falls forward of the center of support at the rear of the rocker. The result is the body automatically returns or tends to return toward the low position, depending on the arrangement of parts and the inclination of the ground upon which the vehicle stands. The body may return clear to the carrying position or only part way. In the latter case a mere touch from the operator will be sufficient to complete the return, and the latch will be engaged and the body ready to do business again. It will be noted that this arrangement of the centers of gravity in relation to a traveling center of support is an exceedingly important feature of my invention because by it when the body is dumped, I get an automatic return of the body.

It will be understood that as the vehicle travels along the body is locked in place by two locks; one holds it against rotation, the other prevents it from being lifted bodily away from the vehicle frame. When the operator releases the first lock the weight over-balances, the body rocks to the rear and dumps. As it rotates and rocks to the rear, the means for locking the body down on the truck are released, because this is only done when the truck is at a standstill or working very slowly, and there is no need of holding the body down on the vehicle frame. As soon as the vehicle is dumped, it swings back to the carrying position, engages the means for holding the body on the frame and also the latch for locking the body against rotation. The body is ready for the next excursion.

It will be understood that while I prefer to have the rolling rocker which carries the body on the vehicle frame lowered completely beneath the body, still under certain circumstances it might be preferable to have this rolling rocker along the body and not beneath it. This might somewhat modify the automatic operation, but any change would only be a change in degree up to the point where the center of gravity goes below the center of support when you would have a case of stable equilibrium instead of unstable equilibrium, and you would no longer have a body which dumped automatically or tended to dump automatically. Anything short of that will differ from my particular preferred arrangement only as above indicated in degree.

In Fig. 11 I have shown more or less diagrammatically a plot of the positions of the center of gravity of the loaded body. It will be noted that the center of gravity which I have marked $c$ falls to the left of the center of support which I have marked $s$, and that as the body rotates, and is moved backward the center of gravity which I have marked $c'$ always remains to the left of the center of support which I have marked $s'$. Now it will be understood that $c$, $c'$ are the centers of gravity of the loaded body and that when the body is unloaded the center of gravity $c'$ will move down say to $c^2$ because of course the maximum weight of the body is at the bottom, but it will be noted that $c^2$ falls to the right of $s'$ and so of course the body returns to the normal upright position, depending on the design. $c^2$ may be at the right of $s$ when the body is upright or it may not. Preferably I make it just to the left so that the operator by hand or otherwise is compelled to securely seat the body in its operating position. This is to give it a greater dumping movement when the body is full, as to move the center of gravity of the body itself over to the right of the center of support would decrease the dumping tendency, as it might neutralize or tend to neutralize the tilting effect caused by the load applied at the loaded center of gravity.

The tail gate as shown remains closed during the dumping operation. The body moves to the dumping position and remains thus inclined as shown in dotted line position until the gate is opened when the load moving en masse is discharged. When the body is free from the load it moves to the return position automatically. If the door is not held closed but freely, swung as the tipping commences, the weight of the material will open the door and that portion of the material at the rear of the body will be spilled out, thus bringing the body substantially into equilibrium and stopping the dumping movement. If this free dumping is permitted at any stage of the dump, it will result in only a partial dump and will bring the body into a condition of substantial equilibrium. In order that a complete dump may be made and in order that the body may move to the full dumping position, it is necessary to hold the load in the body until the body has reached that angle at which the load will dump en masse. When the body has moved to such an angle if the gate be then opened the entire load will start to move en masse. It is true that some partial dumping will occur immediately at the rear of the body, but so long as the whole load is dumping en masse this breaking off at the rear will not prevent a complete dump. As shown in the dotted line position the tail gate will not normally be opened until the body has reached its position of greatest inclination. This position is sufficient to cause practically every substance normally handled by such bodies to dump en masse. For some materials, of course, the angle is greater than is necessary, but it is made steep in order to accommodate a wide variety of materials.

By referring to the movement of the body en masse I mean that there should be a flow of material along substantially the entire floor of the body. This will, of course, take place where the angle of inclination of the floor of the body at the moment the tail gate is opened is greater than the angle of repose of the material with which it is loaded. The load will under normal circumstances dump en masse even where the angle of inclination of the body is slightly less than the angle of repose of the material, but is preferable that it be greater.

I claim:

1. The combination with a vehicle and dumping body of a track on the vehicle frame, a rolling rocker support on the body engaging the track, said track and support having laterally downwardly inclined surfaces to prevent deposition of foreign material.

2. The combination with a vehicle and dumping body of a track on the vehicle frame, a rolling rocker support on the body engaging the track, said track and support having laterally downwardly inclined surfaces to prevent deposition of foreign material, said track and support being toothed, the track being apertured beneath the teeth to permit discharge of foreign material from between them.

3. The combination with a vehicle of a dumping body adapted when full to rotate to dumping position, a latch normally holding the dumping body in place, unit means for releasing the latch and retarding the dumping of the body, said means comprising a manual lever, a latch-engaging lug thereon, a brake band operated by the lever, a drum controlled thereby, and a yielding connection between the drum and the dump body.

4. The combination with a vehicle of a dumping body, a rolling support for the body, a cam slot in said rolling support, a cam engaging member on the vehicle, said member and slot adapted to be in engagement only when the dumping body is in upright position.

5. The combination with a vehicle of a dumping body, means for simultaneously rotating the body to dump it, and moving it bodily with respect to the vehicle, and means for holding the body against vertical movement with respect to the vehicle, said means adapted to hold the body in an upright position and to release it when it is rotated toward the dumping position, comprising a slot and a stop, one on the body and the other on the vehicle, adapted to engage when the body is upright.

6. The combination with a vehicle of a dumping body, means for sumultaneously rotating the body to dump it, and moving it bodily with respect to the vehicle, and means for holding the body against vertical movement with respect to the vehicle, said means adapted to hold the body in an upright position and to release it when it is rotated toward the dumping position, comprising a stop on the vehicle, and a slot on the body adapted to be moved into engagement with said stop by the rotation of the body from tilted to upright position.

7. A vehicle comprising a body, a frame upon which it is movably supported, a releasable locking device for locking the body in its loading position, the center of gravity of the body alone and the combined body and load both being to the rear of the point of support of the body when the body is in its loading position so that when the body is released it will automatically move to its dumping position, means comprising a curved support interposed between the body and frame for moving the body and load, thereby shifting the center of gravity of the body alone to the front of the point of support of said body as the body is moved toward its dumping position, a holding device for holding substantially all the load in the body until the center of gravity of the body alone has reached a predetermined point in front of its point of support sufficient to insure the automatic return of the body to its loading position when empty, and to also insure the bottom of the body attaining an inclination sufficient to permit the movement of the load en masse when said load is released, said holding device adapted to be released to release the load and cause it to be discharged en masse from the body whereby the load is dumped and the body returns automatically to its loading position.

8. The combination with a vehicle and dumping body of tracks on the vehicle frame, rolling rocker supports on the body engaging the track and upwardly extending flanges on the inside of said tracks and downwardly extending flanges on the outside of said rocker supports.

Signed at New Orleans, La., this 8th day of January, 1923.

WILLIAM C. ANTHONY.

Witnesses:

E. E. TALBOT,

PIERRE D. OLIVIER.